United States Patent [19]

Persau

[11] Patent Number: 5,203,655
[45] Date of Patent: Apr. 20, 1993

[54] LOCKING BAR FOR SNOWMOBILE ON TRAILER

[76] Inventor: David Persau, 59 Moshier St., Greenwich, Conn. 06830

[21] Appl. No.: 932,899

[22] Filed: Aug. 20, 1992

Related U.S. Application Data

[63] Continuation-in-part of Ser. No. 796,810, Nov. 22, 1991, abandoned.

[51] Int. Cl.$^5$ .............................................. B60P 7/00
[52] U.S. Cl. .......................................... 410/3; 410/30
[58] Field of Search .................... 410/2, 3, 4, 9, 10, 410/11, 19, 30; 414/233, 234, 286

[56] References Cited

U.S. PATENT DOCUMENTS

| | | |
|---|---|---|
| 3,672,523 | 6/1972 | Albert . |
| 3,726,423 | 4/1973 | Miron ................................. 414/480 |
| 3,730,552 | 5/1973 | Clark . |
| 3,786,950 | 1/1974 | Zemier ................................ 414/483 |
| 3,885,690 | 5/1975 | Ven Slimbrouck ................ 410/3 X |
| 3,923,335 | 12/1975 | Erickson ........................... 414/537 X |
| 3,955,847 | 5/1976 | Schiowitz ........................... 410/4 X |
| 4,671,713 | 6/1987 | Lenkman . |
| 4,772,164 | 9/1988 | McFarland . |
| 4,886,403 | 12/1989 | Greshem ............................... 410/10 |
| 5,005,846 | 4/1991 | Taylor .................................. 410/2 |
| 5,044,845 | 9/1991 | Baker, Jr. ............................. 410/3 |

Primary Examiner—Michael S. Huppert
Assistant Examiner—Stephen T. Gordon
Attorney, Agent, or Firm—Alfred E. Miller

[57] ABSTRACT

A locking device for a powered conveyance having an apertured ski, such as a snowmobile positioned on a trailer, and having a locking bar passing through the aperture of the ski, and provided with an elongated screw-threaded bolt with a crank handle on one end and a nut on the opposite end of the bolt and under the trailer, whereby when the crank handle is rotated the nut is tightened against the bottom of the trailer, and a lock is provided for the crank handle.

9 Claims, 6 Drawing Sheets

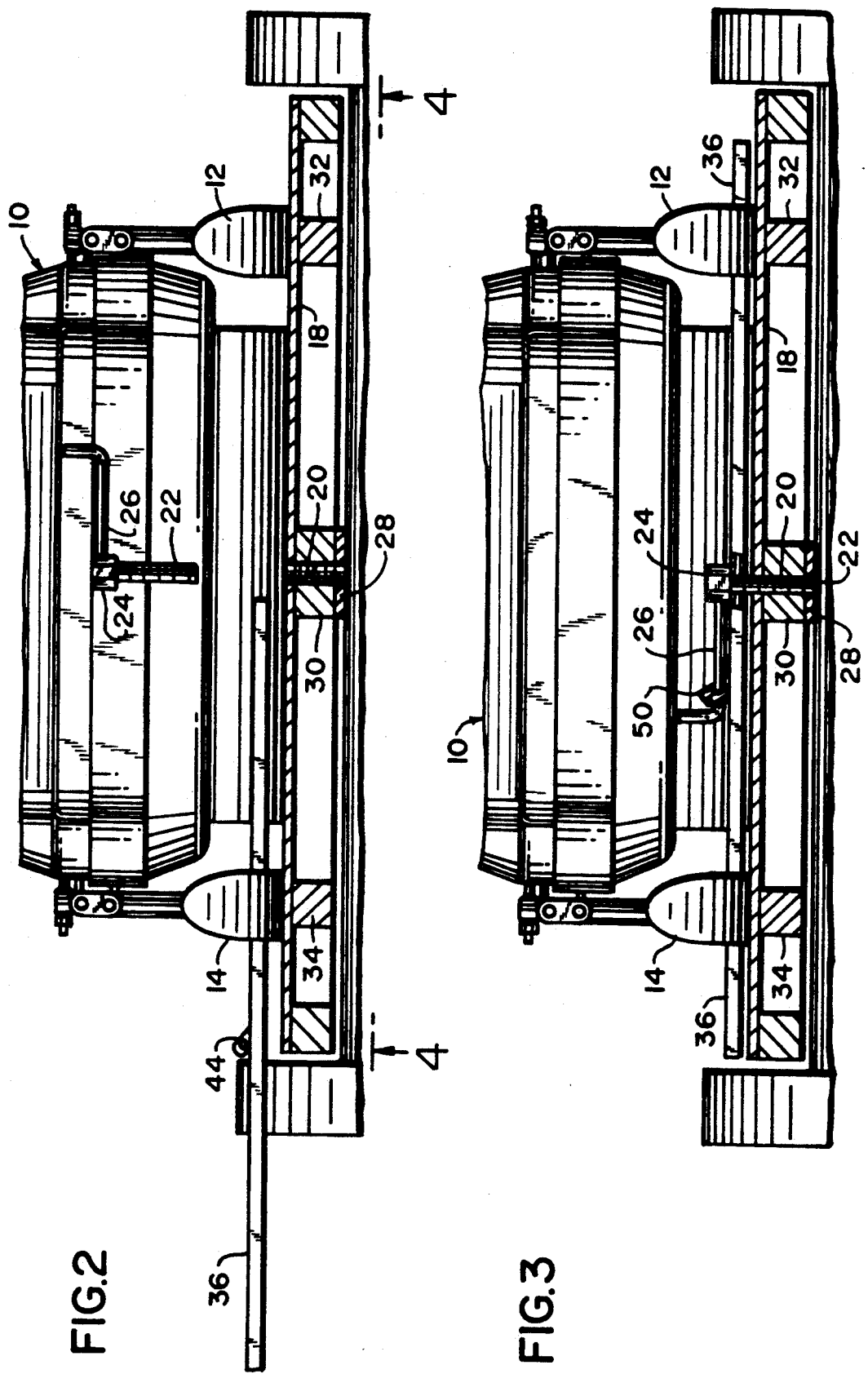

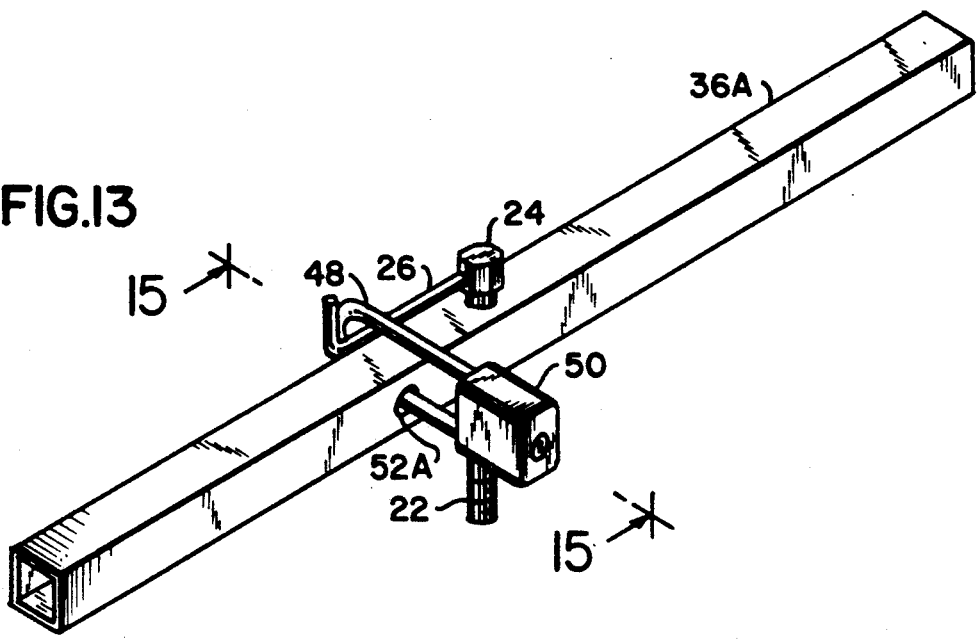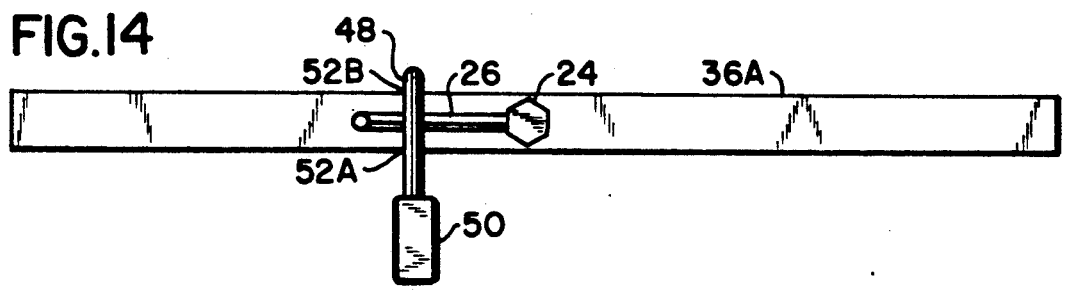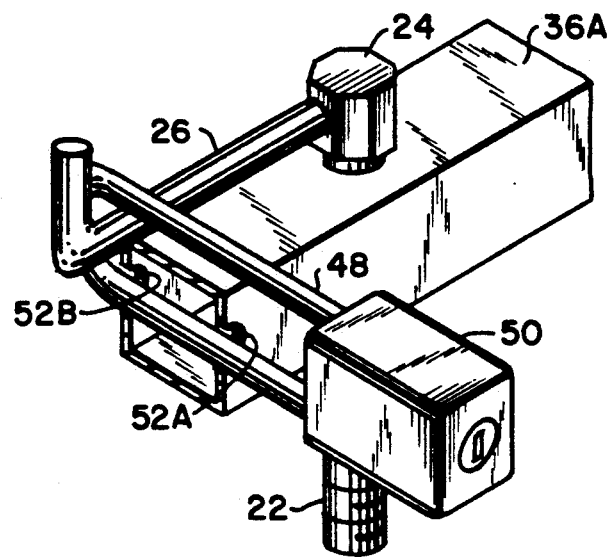

LOCKING BAR FOR SNOWMOBILE ON TRAILER

This application is a continuation-in-part, of application Ser. No. 07/796/810, filed Nov. 22, 1991, now abandoned.

The present invention relates to both a retainer and a locking device for trailer mounted vehicles or conveyances having a ski or skis.

BACKGROUND OF THE INVENTION

In prior art vehicles or conveyances, such as snowmobiles or the so called jet skies which are used on water, sometimes have retaining or holding devices. For example, in U.S. Pat. No. 3,730,552 to Clark an anchoring device for a snowmobile on a trailer is shown in which an apertured bar on the snowmobile is inserted into a selected slot on a retaining plate mounted on a trailer. U.S. Pat. No. 3,672,523 to Albert is directed to a snowmobile trailer which shows a device for holding a snowmobile on a trailer in which an assembly is resiliently urged toward an elevated position, so that it hooks under the snowmobile when it is pulled over the assembly. However, even though these prior art devices disclose holding or retaining means, there is no locking arrangement shown which prevents the holding or retaining device from being removed and the conveyance stolen from the trailer that it rests on.

SUMMARY OF THE INVENTION

In order to overcome the drawbacks of the prior art constructions the present invention is directed to a locking bar which not only retains the conveyance on a trailer such as a snowmobile or a jet ski but also locks the same by means of a key operated device so that the apparatus has a measure of security in order to prevent theft.

In is an object of the present invention to provide a number of locking schemes for snowmobiles and the like to discourage and prevent theft.

Another object of the present invention is to provide a locking arrangement for a hold-down bar for a snowmobile or the like which is simple to fabricate and inexpensive to purchase, yet is reliably effective for the purposes intended.

Yet another object of the present invention is to provide rust-proof parts for a hold-down assembly so that the same can be utilized in any weather and under conditions involving a considerable amount of snow or water which covers or inundates the hold down device.

A further object of the present invention is to provide a locking means which locks the crank handle for the locking bolt to a pivotable hasp.

Still another feature of the present invention is a locking cylinder provided in the hold down bar for locking the handle to the hold down bar.

The above features and objects of my invention will be more fully understood by the following description of the construction and operation in the specification and by reference to the accompanying drawings forming a part thereof in which:

BRIEF DESCRIPTION OF THE DRAWINGS

FIG. 2 is a front elevational view of my invention showing the locking bar being inserted through aligned openings in the skis of the snowmobile.

FIG. 3 is a view taken along the lines 3—3 of FIG. 1.

FIG. 13 is a perspective view of a further embodiment of the present invention showing the padlock shackle passing through drilled holes in the locking bar.

FIG. 14 is a side elevational view of the hold-down locking bar shown in FIG. 13, and FIG. 15 is a view taken along the lines 15—15 of FIG. 13.

DESCRIPTION OF THE PREFERRED EMBODIMENTS

Figure 1:
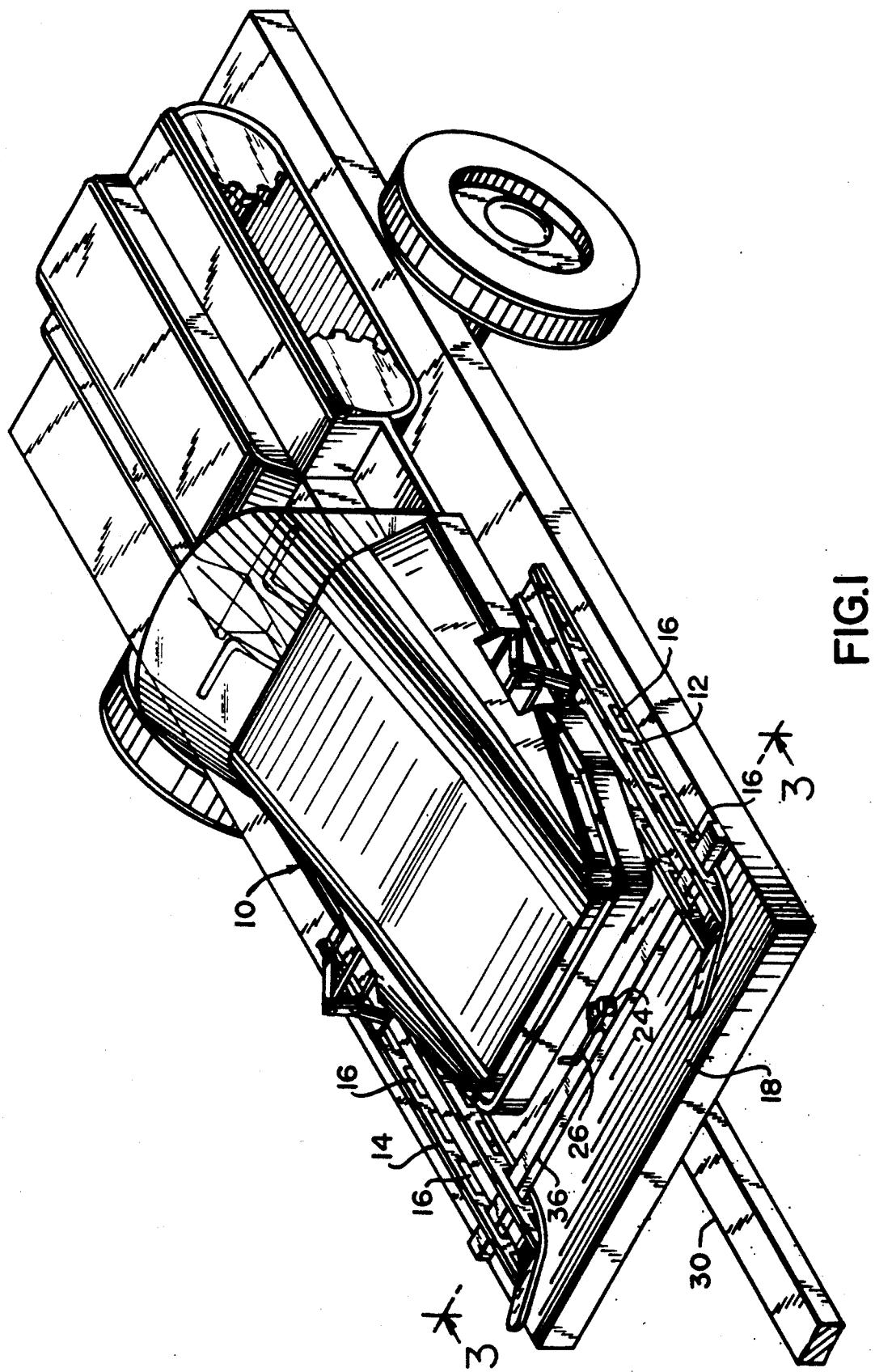
FIG. 1 is a perspective view of the hold down locking device for a snowmobile or other vehicle constructed in accordance with the teachings of my invention.

Referring to FIGS. 1-3, a snowmobile or other type of vehicle or conveyance is shown and referred to generally by the numeral 10. The snowmobile is a tracked vehicle usually provided with gas powered internal combustion engine and having spaced skis 12 and 14 at a forward location thereof. The standard construction of the skis is that they are provided with a plurality of slots 16. The snowmobile 10, or other type of conveyance, rests on a trailer 18, and is provided with a through hole 20 in which a screw threaded elongated bolt 22 is inserted, as seen in FIGS. 2 and 3. The bolt is preferably fabricated of stainless steel in order to resist rusting and corrosion. An integral nut 24, as well as the hold-down bar 36 is located at one end of bolt 22 and is provided with a laterally projecting crank handle 26, shown in FIGS. 1-9. The nut and crank handle, are preferably painted a fluorescent color in order to protect those elements from rusting and corrosion as well as making them more visible if they drop in the snow.

Figure 4:
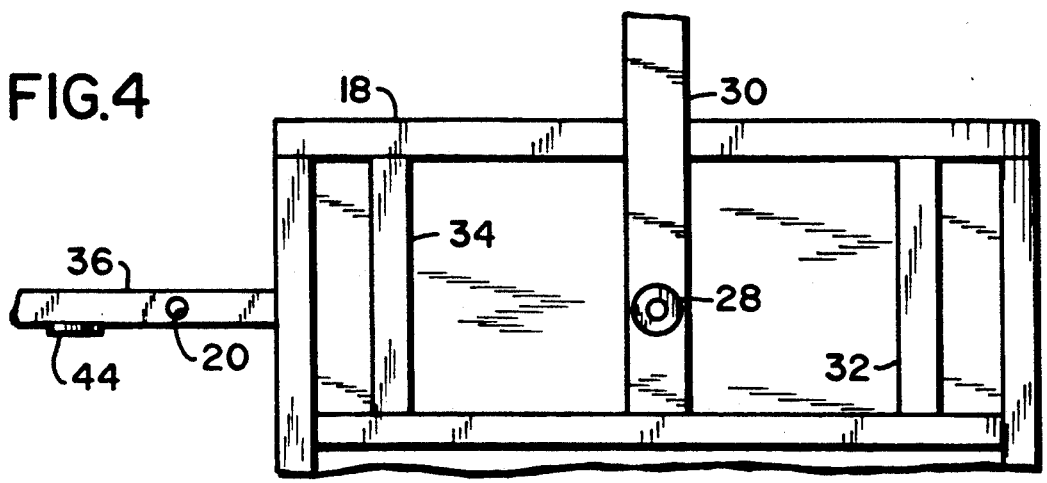
FIG. 4 is a partial bottom plan view of the trailer for the snowmobile, taken along the lines 4—4 of FIG. 2.
Figure 5:
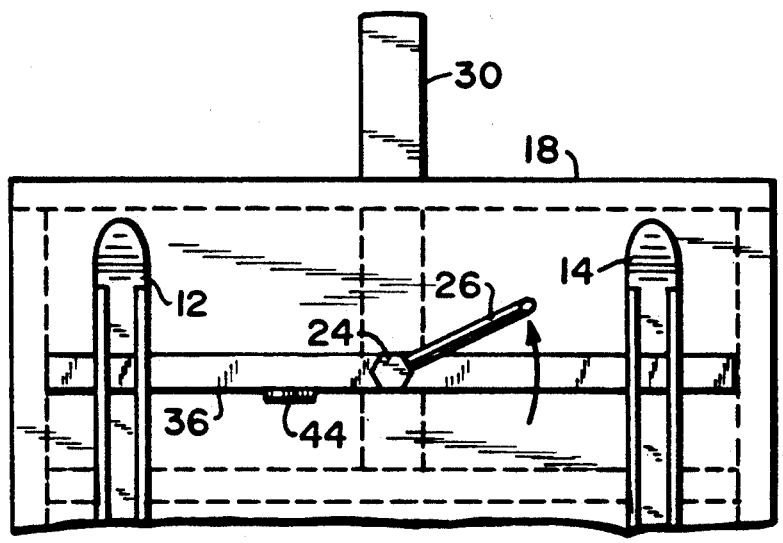
FIG. 5 is a partial top plan view of the snowmobile showing a locking bar and a locking handle in position for counter-clockwise movement in the direction of the arrow.
Figure 6:
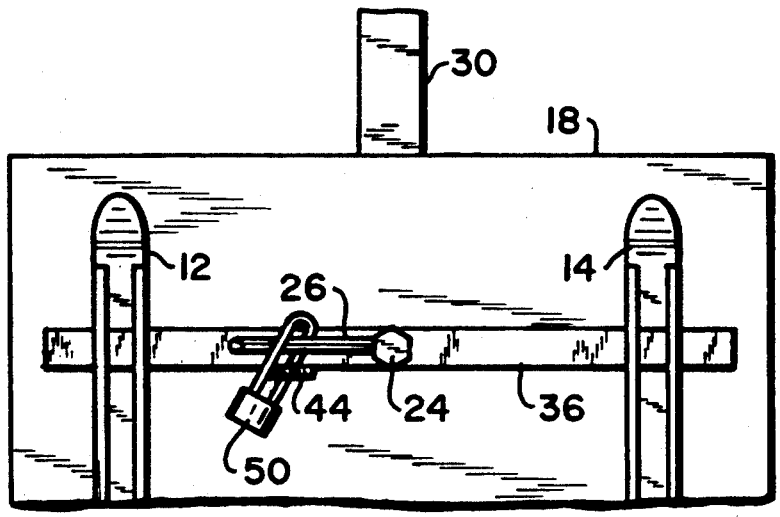
FIG. 6 is a partial top plan view of the trailer and the locking bar arrangement for the skis of the snowmobile showing a padlock connected to the crank handle.

The end remote from the nut 24 is provided with another nut 28, as seen in FIG. 4 of the drawings. As particularly seen in FIG. 2, the undersurface of the trailer bed is provided with a support beam 30 in which the hole 20 is drilled. The trailer is also provided with additional support beams 32 and 34, as particularly seen in FIGS. 2 and 4.

Figure 7:
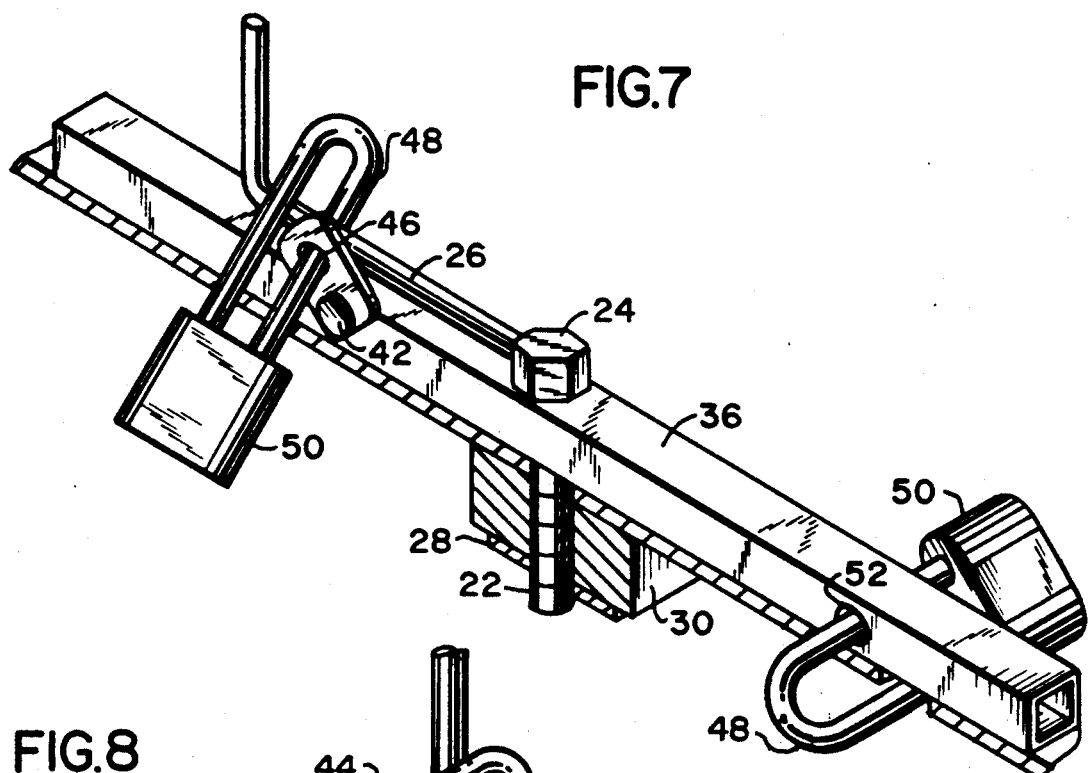
FIG. 7 is an enlarged perspective view of part of the locking bar that shows the crank handle and the pivotable hasp locked together with another arrangement in which a padlock is inserted through a hole drilled through the locking bar.
Figure 8:
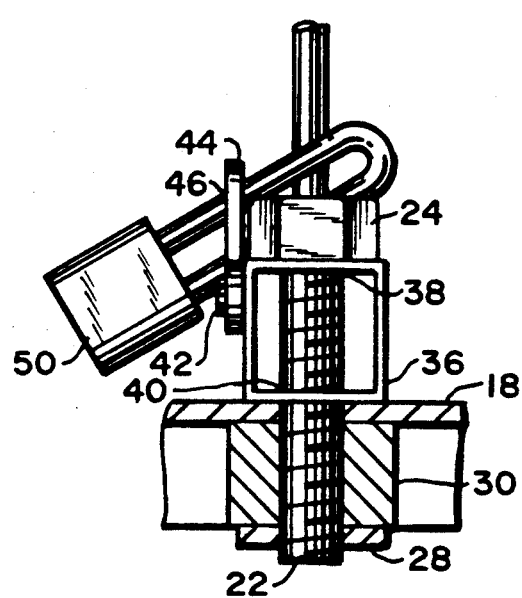
FIG. 8 is a partial elevational view of the locking bar and the padlock passing through the pivotable hasp and the arm of the locking crank.

The elongated locking bar 36 has aligned openings 38 and 40, as seen in FIG. 8, through which the elongated bolt 22 passes initially, and thereafter through the opening 20 in the trailer bed support beam 30. Pivoted to one side of the locking bar 36 at pivot point 42 is a coupling hasp 44, as particularly seen in FIGS. 2, 7 and 8.

In order to securely lock the skis 12, 14 of the snowmobile to the trailer 18, a locking bar 36 is inserted through aligned slots 16 to a position whereby the holes 38 and 40 of the locking bar are aligned with the hole 20 of the trailer support beam 30. Thereafter the bolt 22 is inserted in through the aligned holes and the nut 28 affixed on the bottom side of the trailer. The crank handle 26 is rotated until the nut 28 rides up the bolt and it engages the underside of said trailer and the handle 26 abuts the pivotable coupling hasp 44 so that the hole 46 is in position for shackle 48 of the padlock 50 to be passed through the opening 46 and around the crank handle 26. Thus, the padlock 50 securely fastens the locking bar to the crank handle whereby the bar cannot be slid out of the openings 16 in the skis of the conveyance until the key operated padlock is removed.

Another embodiment of the present locking arrangement is shown in the right hand part of FIG. 7 in which aligned holes 52 are drilled in the side surfaces of the locking bar so that the locking bar 36 cannot be slid out of the aligned slots 16 in the skis unless the padlock in that version, can be removed.

Figure 9:
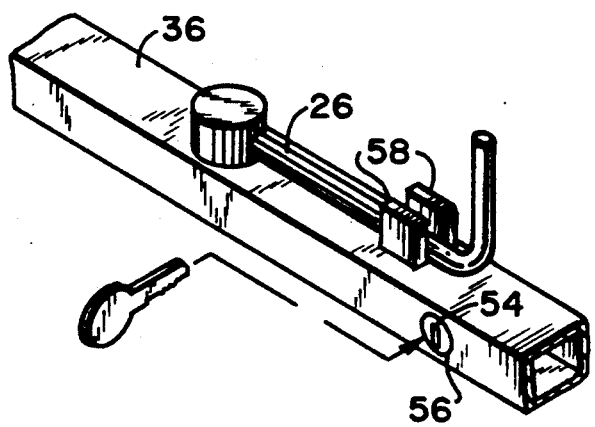
FIG. 9 shows another locking arrangement which is key operated, and in which the cylinder is inserted within the locking bar that operates a pair of spaced bolts on either side of the crank handle.

A further embodiment of the present invention is shown in FIG. 9 in which a locking bar is provided with a locking cylinder 54 inserted through aligned holes 56 in the locking bar 36. The locking cylinder is of the well known type which operates a pair of upstanding locking bars 58 which, when the key is turned to activate the lock, the bars are elevated to positions shown in FIG. 9 on either side of the crank handle 26. When the key is turned to the "off" position the locking bars are drawn down into the hollow channel locking bar so that the crank handle may be freely rotated.

Figure 10:
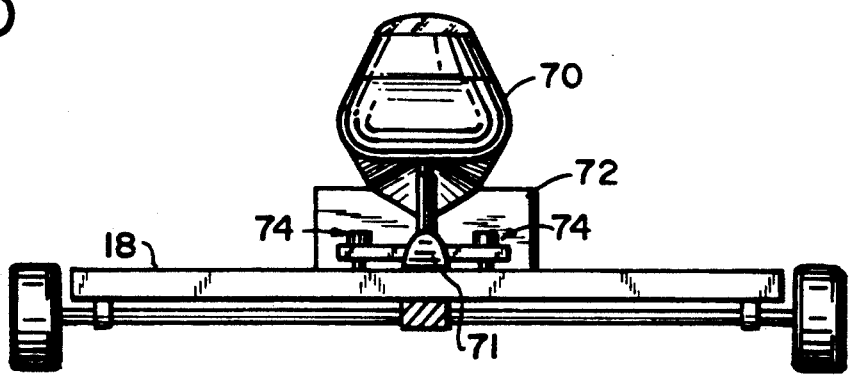
FIGS. 10–12 are an alternate embodiment of the present invention showing a water craft having a single ski in which the locking bar is inserted through a slot therein, and the locking bar is locked on both ends of the bar. The locking principle is the same as that shown in FIG. 6 of the drawings.
Figure 11:
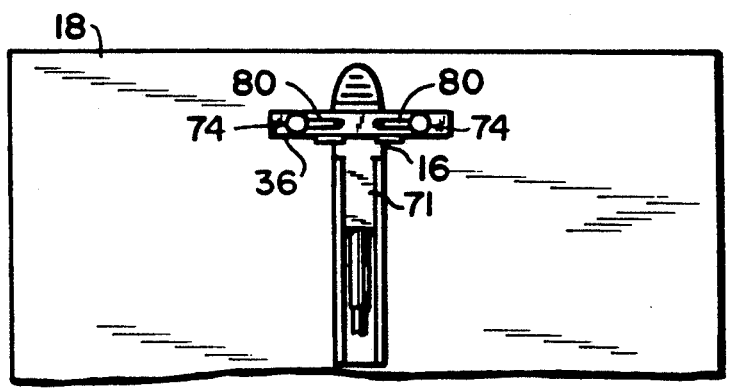
Figure 12:
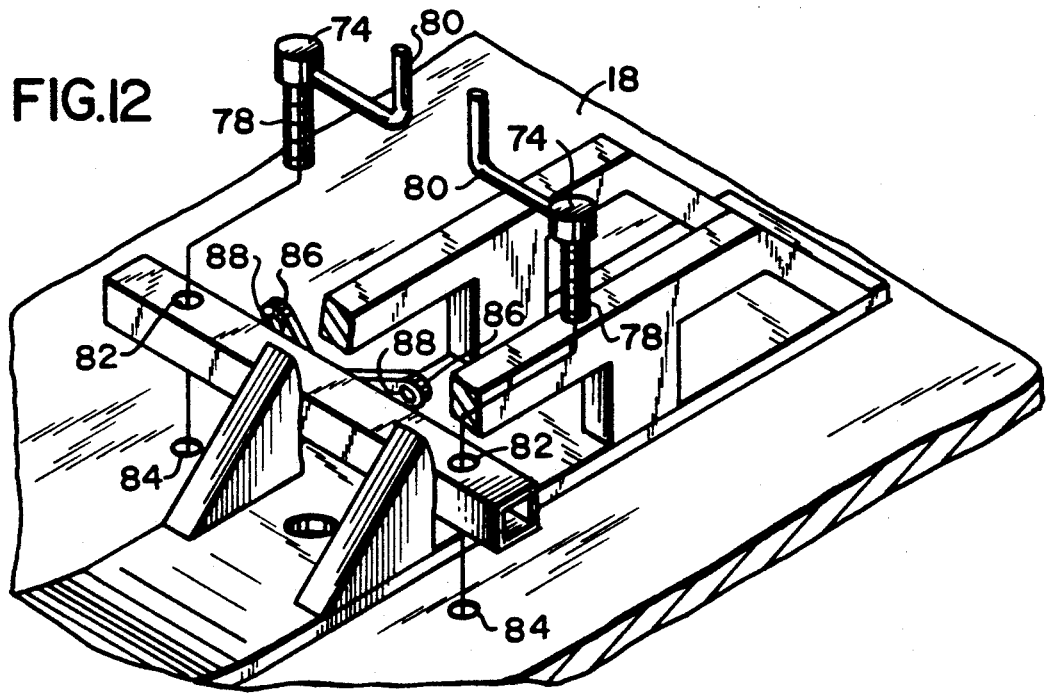

Referring now to FIGS. 10-12 in which another alternate embodiment of the present invention is shown, the mobile trailer supports a water craft, known as a jet ski 70, which is mounted in a V block 72 on the trailer bed. It should be noted that the jet ski is provided with a single ski which has apertures 16 similar to the skis on the snowmobile shown in FIG. 1. A locking bar 36 is inserted through the aperture 16 in the single ski as shown in FIGS. 10 and 11. A provision is made for hold down means 74 at opposite ends of the locking bar. The locking means is clearly shown in FIG. 12 in the form of elongated threaded bolts 78 each having a crank handle 80. The bolts pass through aligned holes or openings 82 and 84 in the locking bar and the trailer bed respectively. Each of the crank handles 80 is adopted to cooperate with the pivoting hasp 66 having an aperture 88 through which a locking means can be inserted in and around the crank handle similar to that shown in the left hand portion of FIG. 7 of the drawings. It should be apparent that the construction of the locking arrangement is the same as that shown in FIGS. 7 and 8 of the drawings with the exception that two locking means are provided for each locking bar in order to securely hold and lock the jet ski against removal from the respective trailer.

While the invention has been disclosed and described with reference to a limited number of embodiments, it will be apparent that variations and modifications may be made therein and it is therefore intended in the following claims to cover each such variation and modifications as falls within the true scope and spirit of the invention.

What I claim is:

1. A hold-down locking device for holding a snowmobile on a trailer, said trailer having a floor and having a first hole drilled through the forward end of said floor, said snowmobile provided with a pair of apertured skis resting on said floor of said trailer, the device comprising: an elongated locking bar passing through an aperture in both skis, said locking bar having a second hole located substantially centrally in said locking bar, an elongated threaded bolt with two ends, a crank handle attached to one of said ends of the bolt, said bolt being inserted through the aligned second and first holes in the locking bar and the trailer floor respectively, a tapped member connected to the other of said ends of said threaded bolt, whereby when said crank handle is rotated said threaded bolt travels with respect to said tapped member to firmly engage the underside of said trailer floor, and thereby securely holding the snowmobile on said trailer, and locking means including an adjustable pivotable member attached to said locking bar and provided with a third hole and a padlock shackle is passed through said third hole for locking said crank handle to said locking bar.

2. A hold-down locking device as claimed in claim 1, wherein said bolt and said tapped member are fabricated of stainless steel in order to resist corrosion.

3. A hold-down locking device as claimed in claim 1, wherein said locking bar and said crank handle are painted with a fluorescent paint in order to be readily located when dropped in the snow.

4. A hold-down locking device for holding a snowmobile on a trailer, said trailer having a floor and having a first hole drilled through the forward end of said floor, said snowmobile provided with a pair of apertured skis resting on said floor of said trailer, the device comprising: an elongated locking bar passing through an aperture in both skis, said locking bar having a second hole located substantially centrally in said locking bar, an elongated threaded bolt with two ends, a crank handle attached to one of said ends of the bolt, said bolt being inserted through the aligned second and first holes in the locking bar and the trailer floor respectively, a tapped member connected to the other of said ends of said threaded bolt, whereby when said crank handle is rotated said threaded bolt travels with respect to said tapped member to firmly engage the underside of said trailer floor, and thereby securely holding the snowmobile on said trailer, and locking means including a key activated locking cylinder in said locking bar, and a pair of spaced restraining bars operated by said cylinder, such that when said locking cylinder is turned to a locked position, said restraining bars are elevated to a raised position on opposite sides of said crank handle and thus preventing rotational movement of said crank handle with respect to said locking bar.

5. A hold-down locking device as claimed in claim 4, wherein said bolt and said tapped member are fabricated of stainless steel in order to resist corrosion.

6. A hold-down locking device as claimed in claim 4, wherein said locking bar and said crank handle are painted with a fluorescent paint in order to be readily located when dropped in the snow.

7. A hold-down locking device for holding a snowmobile on a trailer, said trailer having a floor and having a first hole drilled through the forward end of said floor, said snowmobile being provided with a pair of apertured skis resting on said floor of said trailer, the device comprising: an elongated locking bar passing through an aperture in both skis, said locking bar having a second hole located substantially centrally in said locking bar, an elongated threaded bolt with two ends, a crank handle attached to one of said ends of the bolt, said bolt being inserted through the aligned second and first holes in the locking bar and the trailer floor respectively, a tapped member connected to the other of said ends of said threaded bolt, whereby when the crank handle is fully rotated said threaded bolt travels with respect to said tapped member to firmly engage the underside of said trailer floor, and thereby securely holding the snowmobile on said trailer, and locking means including aligned holes on opposite sides of said locking bar, and a padlock shackle being passed through said aligned holes and around said crank handle to thereby prevent full rotation of said crank handle.

8. A hold-down locking device as claimed in claim 7 wherein said locking bar has a rectangular cross section.

9. A hold-down locking device as claimed in claim 8 wherein said padlock shackle is elongated.

* * * * *